United States Patent
Lee et al.

(10) Patent No.: US 8,459,820 B2
(45) Date of Patent: Jun. 11, 2013

(54) BACK LIGHT UNIT AND LIQUID CRYSTAL DISPLAY USING THE SAME

(75) Inventors: Yongkon Lee, Paju-si (KR); Kiseong Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 117 days.

(21) Appl. No.: 12/318,278

(22) Filed: Dec. 23, 2008

(65) Prior Publication Data

US 2010/0061084 A1 Mar. 11, 2010

(30) Foreign Application Priority Data

Sep. 10, 2008 (KR) .................. 10-2008-0089235

(51) Int. Cl.
*G09F 13/04* (2006.01)
(52) U.S. Cl.
USPC ................... 362/97.4; 362/97.3; 362/561
(58) Field of Classification Search
USPC ............... 362/97.2–97.4, 561, 511, 330, 632, 362/635
See application file for complete search history.

(56) References Cited

U.S. PATENT DOCUMENTS

| | | | |
|---|---|---|---|
| 7,163,319 B2 * | 1/2007 | Kuo et al. | 362/306 |
| 7,172,325 B2 * | 2/2007 | Kim et al. | 362/561 |
| 7,442,564 B2 * | 10/2008 | Andrews | 438/26 |
| 2002/0044437 A1 | 4/2002 | Lee | |
| 2006/0244891 A1 | 11/2006 | Tsubokura et al. | |
| 2007/0247414 A1 | 10/2007 | Roberts | |
| 2009/0128741 A1 * | 5/2009 | Peng et al. | 349/67 |

FOREIGN PATENT DOCUMENTS

| | | |
|---|---|---|
| DE | 102005013804 | 9/2006 |
| DE | 102005049047 | 4/2007 |
| JP | 9-246685 | 9/1997 |
| JP | 10-326517 | 12/1998 |
| KR | 10-2008-0021370 A | 3/2008 |
| WO | WO 94/00793 | 1/1994 |
| WO | WO 2007/083407 | 7/2007 |
| WO | WO 2008/127050 | 10/2008 |

\* cited by examiner

*Primary Examiner* — Jong-Suk (James) Lee
*Assistant Examiner* — Leah S Macchiarolo
(74) *Attorney, Agent, or Firm* — McKenna Long & Aldridge LLP

(57) ABSTRACT

A backlight unit is provided. The backlight unit comprises: a cover bottom: a printed circuit board (PCB) that is supported by the cover bottom; a light emitting element that is positioned on the PCB; an optical film layer that is supported by the cover bottom and that is positioned on the PCB; and a guide that is mounted separately from the light emitting element in a surface of the PCB in order to support the optical film layer.

18 Claims, 4 Drawing Sheets

(a)           (b)           (c)

BACK LIGHT UNIT AND LIQUID CRYSTAL DISPLAY USING THE SAME

This application claims the benefit of Korean Patent Application No. 10-2008-089235 filed on Sep. 10, 2008 which is hereby incorporated by reference for all purposes as if fully set forth herein.

BACKGROUND

1. Field of Invention

This document relates to a backlight unit and a liquid crystal display using the same.

2. Discussion of the Related Art

As research in information-oriented technology develops, a market of a display device, which is a connection medium between a user and information increases. Accordingly, use of a flat panel display (FPD) such as a liquid crystal display (LCD), an organic light emitting diode (OLED), and a plasma display panel (PDP) increases. The LCD that can embody high resolution and that can increase a size as well as decrease a size is widely used.

The LCD is classified as a light receiving display device. The LCD receives light from a backlight unit positioned at a lower part of a liquid crystal panel and expresses an image.

The backlight unit comprises a printed circuit board (PCB) supported by a cover bottom and an optical film layer positioned on the PCB. A light emitting element is positioned on the PCB and light emitted from the light emitting element is transferred to the liquid crystal panel through the optical film layer. The optical film layer positioned on the PCB is formed in a plurality of layers and requires a guide for supporting the layers.

Conventionally, the optical film layer was supported by making a hole in the cover bottom and installing the guide, and because this was performed by a manual operation, as the quantity of the guides increases, there was a problem that an installation time period is extended and a production yield is deteriorated. In a related art guide, due to installation restrictions or various factors, as a diffusion plate substantially supported by the guide is bent, a problem such as lattice mura occurs and thus improvement of the problem is requested.

SUMMARY OF THE INVENTION

Accordingly, the present invention is directed to a backlight unit and liquid crystal display that substantially obviates one or more of the problems due to limitations and disadvantages of the related art.

In accordance with the purpose of the present invention, as embodied and broadly described, a backlight unit comprises: a cover bottom; a PCB that is supported by the cover bottom; a light emitting element that is positioned on the PCB; an optical film layer that is supported by the cover bottom and that is positioned on the PCB; and a guide that is mounted separately from the light emitting element in a surface of the PCB in order to support the optical film layer.

In another aspect, a LCD comprises: a backlight unit that comprises a PCB that is supported by a cover bottom, a light emitting element that is positioned on the PCB, an optical film layer that is supported by the cover bottom and that is positioned on the PCB, and a guide that is mounted separately from the light emitting element in a surface of the PCB in order to support the optical film layer; and a liquid crystal panel that displays an image using light emitted from the backlight unit.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION OF THE ILLUSTRATED EMBODIMENTS

Reference will now be made in detail to embodiments of the present invention examples of which are illustrated in the accompanying drawings.

Figure 1:
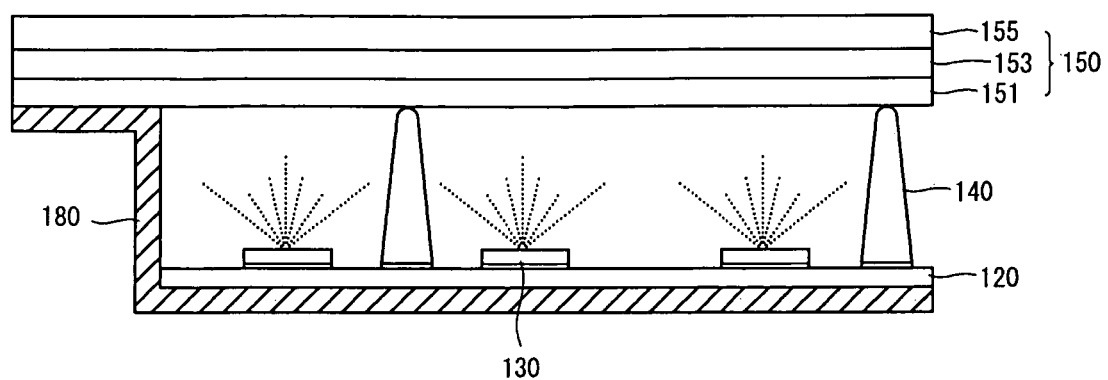
FIG. 1 is a schematic cross-sectional view of a backlight unit according to an embodiment of this document.

As shown in FIG. 1, a backlight unit according to an embodiment of this document includes a cover bottom 180. Further, the backlight unit includes a printed circuit board (PCB) 120 that is supported by the cover bottom 180. Further, the backlight unit includes a light emitting element 130 that is positioned on the PCB 120. Further, the backlight unit comprises an optical film layer 150 that is supported by the cover bottom 180 and that is positioned on the PCB 120. Further, the backlight unit comprises a guide 140 that is mounted separately from the light emitting element 130 on a surface of the PCB 120 in order to support the optical film layer 150.

The cover bottom 180 is made of a material having high durability and heat resistance. The cover bottom 180 may have steps corresponding to constituent elements in order to receive constituent elements comprised in the backlight unit.

The PCB 120 may be attached and fixed to a floor surface of the cover bottom 180. A pad in which an element is mounted and a wire connected to the pad may be positioned at the PCB 120.

The light emitting element 130 may be attached to the pad positioned on the PCB 120 and emit light by power supplied through the wire. The light emitting element 130 may use a light emitting diode (LED) and an OLED.

When the light emitting element 130 is an LED, the light emitting element 130 may be formed on a surface mount device mounted on a surface of the PCB 120. Because the surface mount device mounted on the surface of the PCB 120 is automatically inserted and soldered by surface mount technology, a process time period is effectively shortened.

The optical film layer 150 may be formed to have a plurality of layers for performing an optical function. The optical film layer 150 may comprise a diffusion plate 151, a diffusion sheet 153, and an optical sheet 155. The optical sheet 155 may use a sheet having a shape such as a prism shape, a lenticular lens shape, and a micro lens shape. In order to improve an optical effect, the optical sheet 155 may comprise a submaterial such as a bead.

In order to support the optical film layer 150, the guide 140 is mounted separately from the light emitting element 130 on a surface of the PCB 120. Light is generally emitted from the light emitting element 130 through the optical film layer 150, and in order to improve an optical effect, an optical gap required between the light emitting element 130 and the optical film layer 150. When an optical gap between the light emitting element 130 and the optical film layer 150 is sustained, the guide 140 performs a function of preventing the optical film layer 150 formed in a plurality of layers from being decreased or deformed. The guide 140 together with the light emitting element 130 is formed on a surface mount device on order to mount in the surface of the PCB 120 by surface mount technology. The guide 140 is mounted separately from the light emitting element 130 on a surface of the PCB 120 and has a different quantity and disposition according to a size of the backlight unit.

The guide 140 is described in detail hereinafter.

Figure 2:
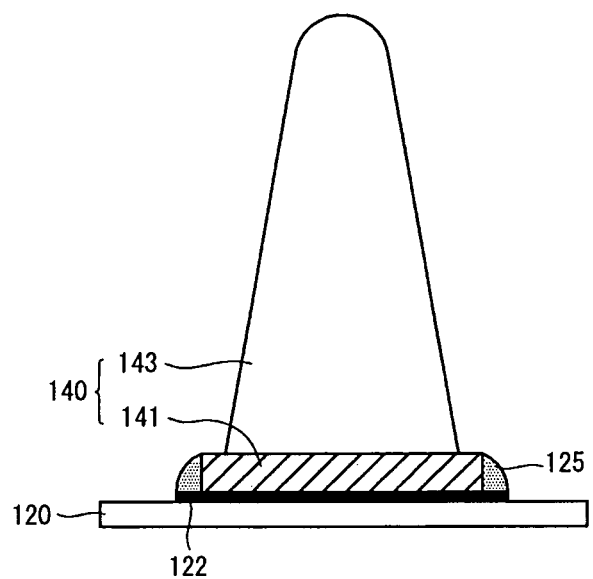
FIG. 2 is a view illustrating a guide mounted in a surface of a PCB.

As shown in FIG. 2, the guide 140 that is mounted on the surface of the PCB 120 comprises a base 141 that is made of a metal material and a body 143 that is protruded from the base 141. As described above, when the light emitting element 130 and the guide 140 are formed on a surface mount device mounted in the surface of the PCB 120, a first pad (not shown) patterned to mount the light emitting element 130 and a second pad 122 patterned to mount the guide 140 are formed on the surface of the PCB 120.

When the light emitting element 130 and the guide 140 are formed on a surface mount device, the light emitting element 130 and the guide 140 are automatically inserted and soldered on the surface of the PCB 120 by a surface mount technology, and thus a process time period can be shortened and a production yield of the backlight can be improved. FIG. 2 illustrates the guide 140 soldered by a lead 125.

Figure 3:
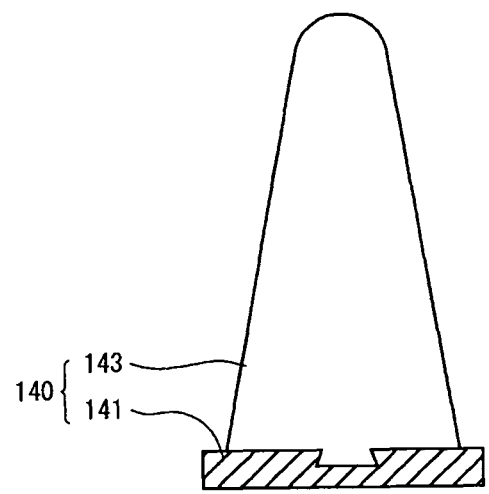
FIGS. 3 to 5 are diagrams illustrating an internal structure of the guide.
Figure 4:
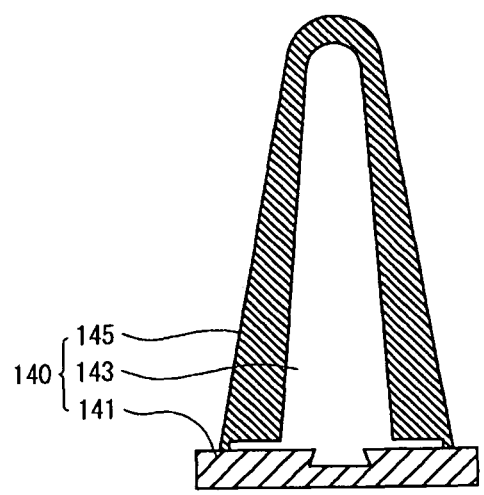
Figure 5:
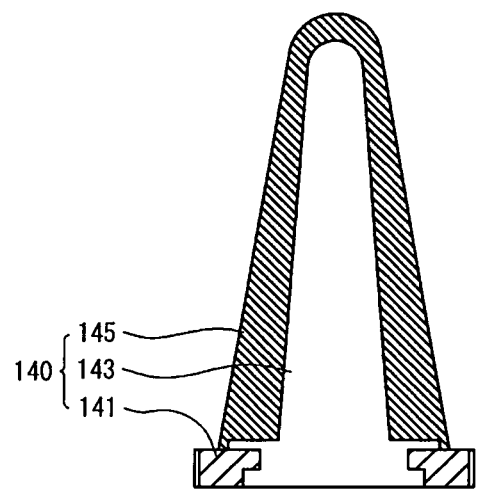

Referring to FIGS. 3 to 5, the guide 140 may be formed in various structures.

Referring to FIG. 3, the guide 140 includes a body 143 that is protruded to be attached to a groove formed in the base 141. The body 143 that is parts of the guide 140 may have an upper part of a round conical shape.

The base 141 that is included as part of the guide 140 shown in FIG. 3 may be made of a metal material, and the body 143 may be made of an organic material or an inorganic material.

Referring to FIG. 4, the guide 140 includes a first body 143 that is protruded and attached to a groove formed in the base 141 and a second body 145 that covers the first body 143. The first body 143 and the second body 145 that are comprised in the guide 140 may have an upper part of a round conical shape.

The base 141 that is comprised in the guide 140 shown in FIG. 4 may be made of a metal material, and the first body 143 and the second body 145 may be made of an organic material or an inorganic material.

Referring to FIG. 5, the guide 140 comprises a first body 143 that is protruded to be attached to a hole formed in the base 141 and a second body 145 that covers the first body 143. The first body 143 and the second body 145 that are comprised in the guide 140 may have an upper part of a round conical shape.

The base 141 that is comprised in the guide 140 shown in FIG. 5 may be made of a metal material, and the first body 143 and the second body 145 may be made of an organic material or an inorganic material. For example, the first body 143 may be made of an organic material such as polyphthalamide (PPA), and the second body 145 may be made of an inorganic material such as silicon, however the first body 143 and the second body 145 are not limited thereto.

The guide 140 of FIG. 5 is not limited to the above form and may be formed in a form in which the first body 143 is inserted into a lower part of the base 141 and the second body 145 is coupled to the first body 143.

The guide 140 is not limited to an upper part of a round conical shape and may be formed in the following shape.

As shown in FIG. 6(a), the guide 140 may be formed in a conical shape having a wide lower part, a narrow upper part, and a flat upper end.

As shown in FIG. 6(b), the guide 140 may be formed in a conical shape having a wide lower part, a narrow upper part, and a polygonal upper end.

As shown in FIG. 6(c), the guide 140 may be formed in a conical shape having a wide lower part, a narrow upper part, and a relatively pointed upper end.

However, a shape of the guide 140 is not limited thereto and may be formed in various forms such as a round cylindrical shape, a quadrangular pillar shape, and a polygonal pillar shape other than a conical shape.

According to the embodiment, the guide 140 may be formed in a structure that can prevent a scratch problem of a surface of a layer directly contacting with the guide 140 as well as a strong resisting force on an external impact.

Figure 7:
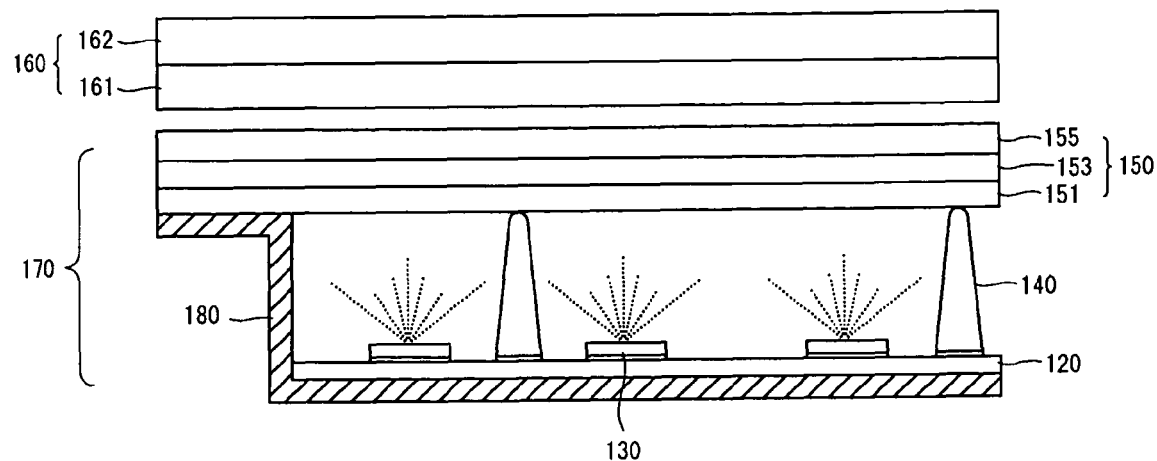
FIG. 7 is a schematic cross-sectional view of a LCD according to another embodiment of this document.

Referring to FIG. 7, a LCD according to an embodiment of this invention includes a backlight unit comprising the PCB 120 that is supported by the cover bottom 180, the light emitting element 130 that is positioned on the PCB 120, the optical film layer 150 that is supported by the cover bottom 180 and that is positioned on the PCB 120, and the guide 140 that is mounted separately from the light emitting element 130 on the surface of the PCB 120 in order to support the optical film layer 150. Further, the LCD may comprise a liquid crystal panel 160 that is positioned on a backlight unit 170 and that displays an image using light emitted from the backlight unit 170.

The optical film layer 150 that is comprised in the backlight unit 170 may be formed in a plurality of layers for performing an optical function. The optical film layer 150 may comprise the diffusion plate 151, the diffusion sheet 153, and the optical sheet 155. Here, the optical sheet 155 may use a sheet having a prism shape, a lenticular lens shape, or a micro lens shape. In order to improve an optical effect, a sub-material such as a bead may be comprised in the optical sheet 155.

In order to support the optical film layer 150, the guide 140 may be mounted separately from the light emitting element 130 in a surface of the PCB 120.

Light is generally emitted from the light emitting element 130 through the optical film layer 150, and in order to improve an optical effect, an optical gap requires between the light emitting element 130 and the optical film layer 150. When an optical gap between the light emitting element 130 and the optical film layer 150 is sustained, the guide 140 performs a function of preventing the optical film layer 150 formed in a plurality of layers from being drooped or deformed. The guide 140 together with the light emitting element 130 is formed in a surface mount device in order to mount in the surface of the PCB 120 by a surface mount technology.

When the light emitting element 130 and the guide 140 are formed on a surface mount device on the surface of the PCB 120, the light emitting element 130 and the guide 140 are automatically inserted and soldered in the surface of the PCB 120 by a surface mount technology, and thus a process time period can be shortened and a production yield of the LCD can be improved.

Referring to FIGS. 2 to 5, the guide 140 may be formed in various structures.

Therefore, as shown in FIG. 2, the guide 140 that is mounted on the surface of the PCB 120 comprises a base 141 that is made of a metal material and a body 143 that is protruded from the base 141. As described above, when the light emitting element 130 and the guide 140 are formed in a surface mount device in the surface of the PCB 120, a first pad (not shown) patterned to mount the light emitting element 130 and a second pad 122 patterned to mount the guide 140 are formed in the surface of the PCB 120.

When the light emitting element 130 and the guide 140 are formed on a surface mount device, the light emitting element 130 and the guide 140 are automatically inserted and soldered in the surface of the PCB 120 by a surface mount technology, and thus a process time period can be shortened and a production yield of the backlight can be improved. FIG. 2 illustrates the guide 140 soldered by a lead 125.

Further, as shown in FIGS. 3 to 5, the guide 140 may be formed in various structures.

First, referring to FIG. 3, the guide 140 may comprise the body 143 protruded to be attached to a groove that is formed in the base 141. The body 143 that is comprised in the guide 140 may have an upper part of a round conical shape.

The base 141 that is comprised in the guide 140 shown in FIG. 3 may be made of a metal material, and the body 143 may be made of an organic material or an inorganic material.

Next, as shown in FIG. 4, the guide 140 comprises a first body 143 that is protruded to be attached to a groove formed in the base 141 and a second body 145 that covers the first body 143. The first body 143 and the second body 145 that are comprised in the guide 140 may have an upper part of a round conical shape.

The base 141 that is comprised in the guide 140 shown in FIG. 4 may be made of a metal material, and the first body 143 and the second body 145 may be made of an organic material or an inorganic material.

Next, as shown in FIG. 5, the guide 140 comprises a first body 143 that is protruded to be attached to a hole formed in the base 141 and a second body 145 that covers the first body 143. The first body 143 and the second body 145 that are comprised in the guide 140 may have an upper part of a round conical shape.

The base 141 that is comprised in the guide 140 shown in FIG. 5 may be made of a metal material, and the first body 143 and the second body 145 may be made of an organic material or an inorganic material. For example, the first body 143 may be made of an organic material such as PPA, and the second body 145 may be made of an inorganic material such as silicon, however the first body 143 and the second body 145 are not limited thereto.

The guide 140 of FIG. 5 is not limited to the above form and may be formed in a form in which the first body 143 is inserted into a lower part of the base 141 and the second body 145 is coupled to the first body 143.

Figure 6:
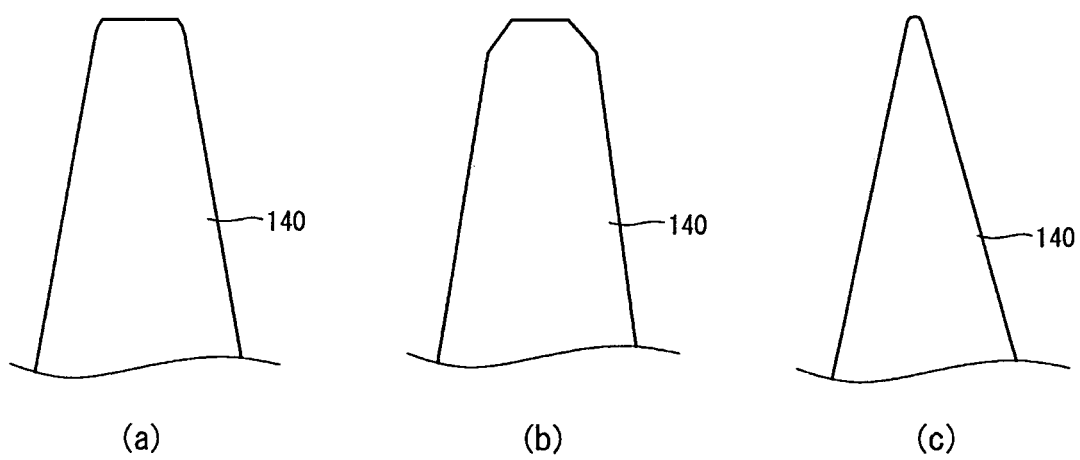
FIG. 6 is a diagram illustrating an external shape of the guide.

Referring to FIG. 6, the guide 140 is not limited to have an upper part of a round conical shape and may be formed in various shapes.

Therefore, as shown in FIG. 6(*a*), the guide 140 may be formed in a conical shape having a wide lower part, a narrow upper part, and a flat upper end.

Further, as shown in FIG. 6(*b*), the guide 140 may be formed in a conical shape having a wide lower part, a narrow upper part, and a polygonal upper end.

Further, as shown in FIG. 6(*c*), the guide 140 may be formed in a conical shape having a wide lower part, a narrow upper part, and a relatively pointed upper end.

However, a shape of the guide 140 is not limited thereto and may be formed in various forms such as a round cylindrical shape, a quadrangular pillar shape, and a polygonal pillar shape other than a conical shape.

According to the embodiment, the guide 140 may be formed in a structure that can prevent a scratch problem of a surface of a layer directly contacting with the guide 140 as well as a strong resisting force on an external impact.

Figure 8:
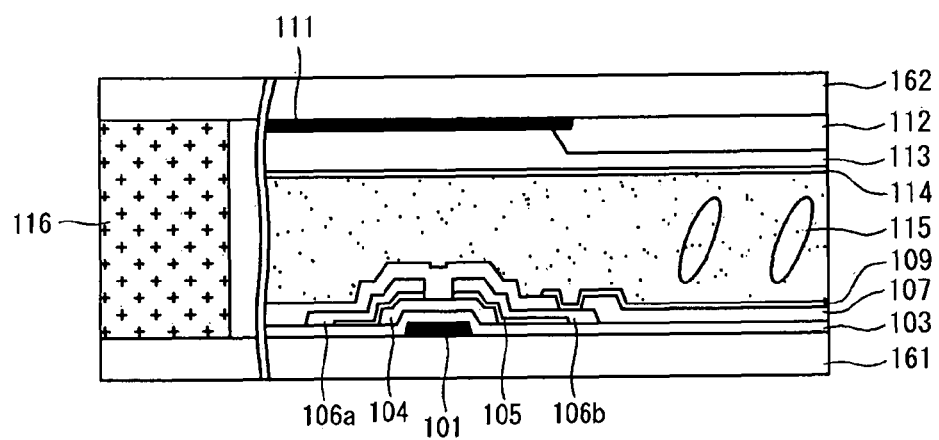
FIG. 8 is a cross-sectional view of a liquid crystal panel.

As shown in FIG. 8, the liquid crystal panel comprises a gate electrode 101 that is positioned on a first substrate 161. Further, the liquid crystal panel may comprise a first insulating film 103 that is positioned on the gate electrode 101. Further, the liquid crystal panel may comprise an active layer 104 that is positioned on the first insulating film 103. Further, the liquid crystal panel may comprise an ohmic contact layer 105 that is positioned on the active layer 104. Further, the liquid crystal panel may comprise a source electrode 106*a* and a drain electrode 106*b* that are positioned on the ohmic contact layer 105. Further, the liquid crystal panel may comprise a second insulating film 107 that is positioned on the source electrode 106*a* and the drain electrode 106*b*. Further, the liquid crystal panel may comprise a pixel electrode 109 that is positioned on the second insulating film 107 and that is connected to the source electrode 106*a* or the drain electrode 106*b*. As a material of the pixel electrode 109, indium tin oxide (ITO) or indium zinc oxide (IZO) may be used, but the material of the pixel electrode 109 is not limited thereto.

A black matrix 111 may be positioned on a second substrate 162 opposite to the first substrate 161. The black matrix 111 may comprise a photosensitive organic material to which a black pigment is added, and as the black pigment, carbon black or titanium oxide, etc. may be used, but the black pigment is not limited thereto. Further, a color filter 112 comprising a red color, a green color, and a blue color may be positioned between the black matrixes 111. The color filter 112 may have other colors as well as a red color, a green color, and a blue color. Further, an overcoating layer 113 may be formed to cover the black matrix 111 and the color filter 112, and in some cases, the overcoating layer 113 may be omitted. Further, in order to connect to a common voltage wiring, a common electrode 114 may be positioned on the overcoating layer 113.

The first substrate 161 and the second substrate 162 may be bonded by a sealant 116, and the liquid crystal layer 115 may be positioned between the first substrate 161 and the second substrate 162.

In the foregoing description, an example in which the common electrode 114 is positioned on the overcoating layer 113 that is positioned on the second substrate 162 is illustrated, but the common electrode 114 may be positioned in at least one of the first substrate 161, the second insulating film 107, and the second substrate 162.

Although not shown in FIG. 8, a spacer for sustaining a cell gap may be positioned between the first substrate 161 and the second substrate 162. The spacer may be positioned at an upper part of a transistor that is positioned on the first substrate 161, but a position of the spacer is not limited thereto.

Although not shown in FIG. 8, a scan wiring, a data wiring, and a common voltage wiring may be positioned on the first substrate 161. One transistor and capacitor may be positioned at an intersecting region of the scan wiring and the data wiring, and this is defined as one subpixel.

In the liquid crystal panel 160 formed in this way, when a transistor is driven by a scan signal and a data signal that are supplied to a scan driver and a data driver, light emitted from the backlight unit 170 is controlled by the liquid crystal layer 115 and an image is expressed using light emitted through the color filter 112.

As described above, in an embodiment of this document, by effectively supporting and supporting the optical film layer, a problem that lattice mura occurs can be prevented and a guide that can shorten a process time period can be provided. Further, a guide that can solve a problem that a scratch occurs in a diffusion plate that is comprised in the optical film layer can be provided. Further, because the guide can be automatically inserted and mounted, when the guide is installed, a problem that the guide is damaged can be prevented. Further, by improving a structure of the guide, a quality and reliability of a backlight unit and a LCD can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit comprising:
   a cover bottom;
   a printed circuit board (PCB) that is supported by the cover bottom;
   a first mounting pad and a second mounting pad patterned directly on a top surface of the printed circuit board;
   a light emitting element that is soldered on the first mounting pad;
   an optical film layer that is supported by the cover bottom and that is positioned over the PCB; and
   a guide having a base portion made of a metal material and a body portion, wherein the base portion of the guide is soldered directly on a top surface of the second mounting pad to support the optical film layer.

2. The backlight unit of claim 1, wherein the guide is automatically inserted and soldered on the top surface of the second mounting pad by a surface mount technology.

3. The backlight unit of claim 1, wherein the body portion of the guide comprises a portion that is protruded from the second mounting pad.

4. The backlight unit of claim 1, wherein the body portion of the guide comprises a first body that is protruded from the second mounting pad, and a second body that covers the first body.

5. The backlight unit of claim 1, wherein the body portion of the guide comprises a first body that is protruded from the second mounting pad and that is made of an organic material, and a second body that is made of an inorganic material to cover the first body.

6. The backlight unit of claim 1, wherein the guide has an upper end of a round conical shape.

7. The backlight unit of claim 1, wherein the guide has an upper end of a flat conical shape.

8. The backlight unit of claim 1, wherein the guide has an upper end of a polygonal conical shape.

9. The backlight unit of claim 1, wherein the guide has an upper end of a pointed conical shape.

10. A liquid crystal display (LCD) comprising:
    a backlight unit that comprises a PCB that is supported by a cover bottom, a first mounting pad and a second mounting pad patterned directly on a top surface of the PCB, a light emitting element that is soldered on the first mounting pad, an optical film layer that is supported by the cover bottom and that is positioned over the PCB, and a guide that has a base portion made of a metal material and a body portion portion, wherein the base portion of the guide is soldered directly on a top surface of the second mounting pad to support the optical film layer; and
    a liquid crystal panel that displays an image using light emitted from the backlight unit.

11. The LCD of claim 10, wherein the guide is automatically inserted and soldered on the top surface of the second mounting pad by a surface mount technology.

12. The LCD of claim 10, wherein the body portion of the guide comprises a portion that is protruded from the second mounting pad.

13. The LCD of claim 10, wherein the body portion of the guide comprises a first body that is protruded from the second mounting pad, and a second body that covers the first body.

14. The LCD of claim 10, wherein the body portion of the guide comprises a first body that is protruded from the second pad and that is made of an organic material, and a second body that is made of an inorganic material to cover the first body.

15. The LCD of claim 10, wherein the guide has an upper end of a flat conical shape.

16. The LCD of claim 10, wherein the guide has an upper end of a polygonal conical shape.

17. The LCD of claim 10, wherein the guide has an upper end of a pointed conical shape.

18. The LCD of claim 10, wherein the guide has an upper end of a round conical shape.

* * * * *